May 27, 1924.
L. F. KEPPLER
1,495,328
PLANT SETTING MACHINE
Filed July 13, 1921    3 Sheets-Sheet 3
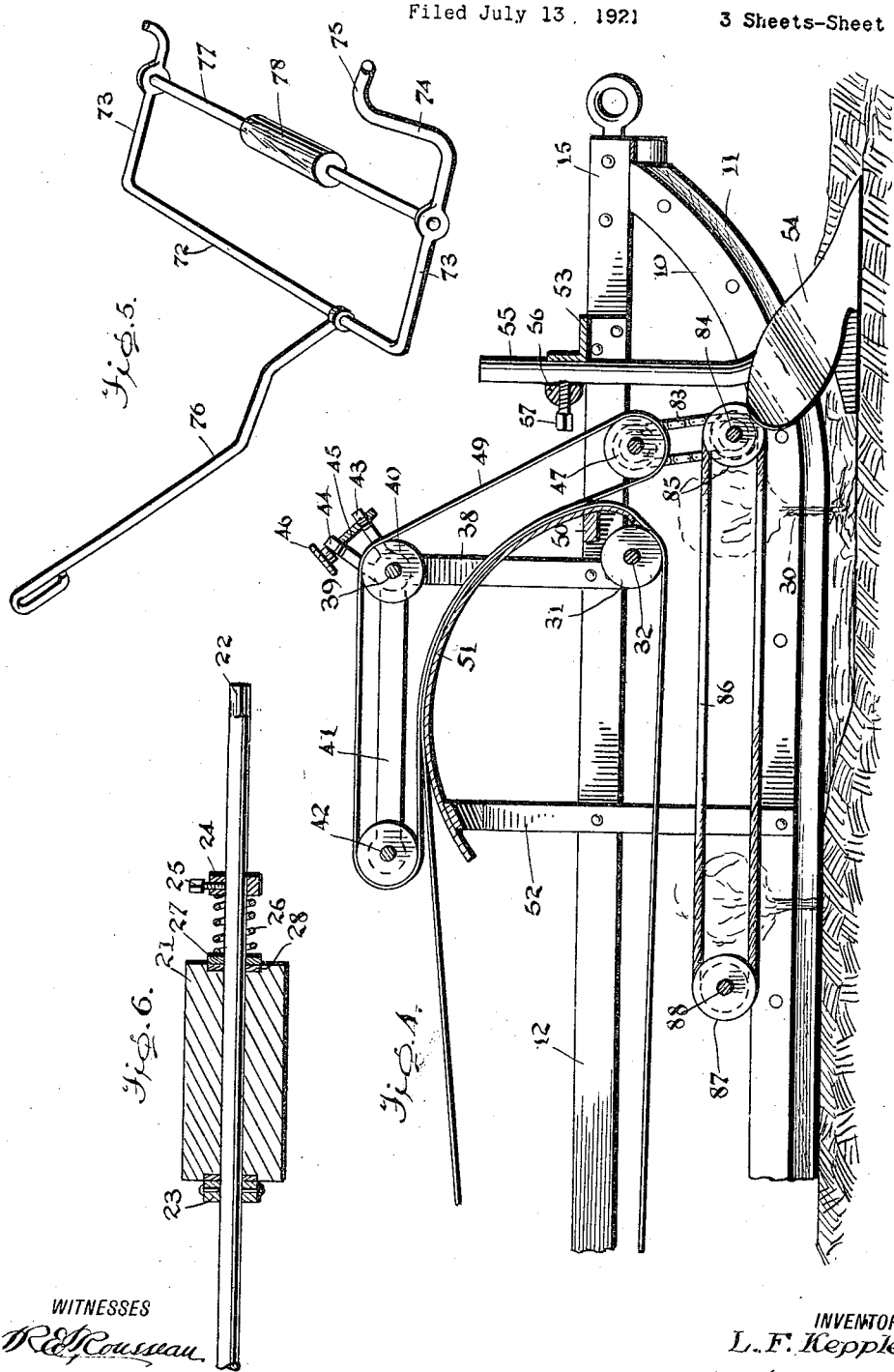
WITNESSES
INVENTOR
L. F. Keppler,
BY
ATTORNEYS Patented May 27, 1924.

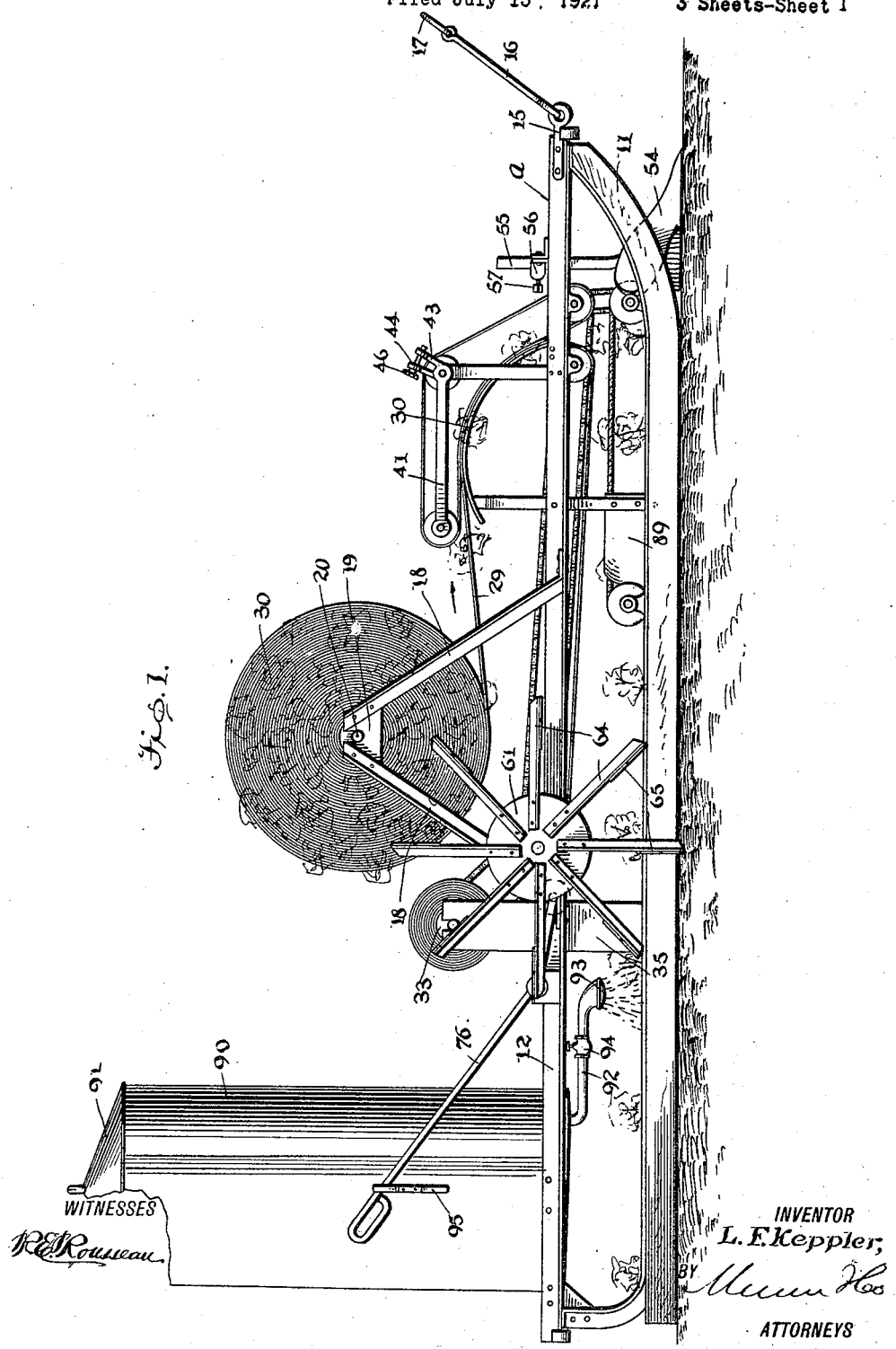

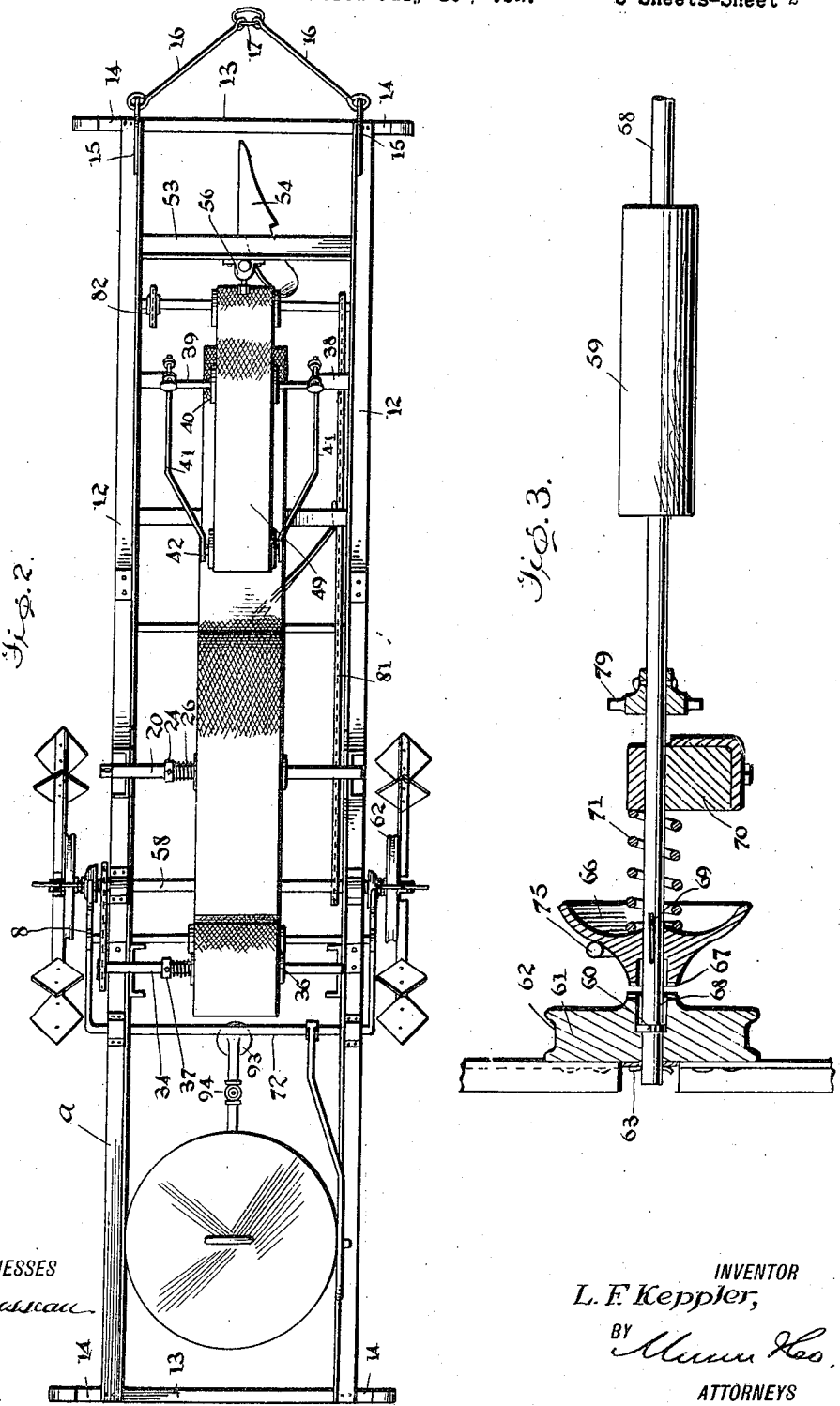

1,495,328

UNITED STATES PATENT OFFICE.

LOUIS F. KEPPLER, OF SANFORD, FLORIDA.

PLANT-SETTING MACHINE.

Application filed July 13, 1921. Serial No. 484,515.

*To all whom it may concern:*

Be it known that I, LOUIS F. KEPPLER, a citizen of the United States, and a resident of Sanford, in the county of Seminole and State of Florida, have invented certain new and useful Improvements in Plant-Setting Machines, of which the following is a specification.

This invention relates to a plant setting machine.

The object of the invention is to provide a machine of the above character by which cabbage plants, celery plants or similar plants which require transferring from the hotbeds to the field may be reset in an efficient manner.

It is a further object of the invention that entire operation for resetting or planting the plants will be entirely automatic and that a number of plants may be reset or transplanted in a short interval of time.

It is a further object of the invention that means be associated with the machine whereby each of the plants after being reset may be given an initial watering.

With the above and other objects in view the invention consists of the novel construction, combination and arrangement of parts to be hereinafter more fully described, claimed and illustrated in the accompanying drawings, in which:—

Figure 1 is a side elevation of a plant setting machine constructed in accordance with the present invention, Figure 2 is a top plan view thereof, Figure 3 is a longitudinal vertical sectional view illustrating the manner in which the power clutch operates, Figure 4 is a longitudinal vertical sectional view illustrating the construction of the forward portion of the plant setting machine, Figure 5 is a detail perspective view illustrating the combined clutch control lever and belt tension roller associated therewith, Figure 6 is a longitudinal sectional view illustrating the manner in which the plant carrying belt is yieldingly restrained from movement.

Referring to the drawings more particularly, A indicates generally a sled which comprises the pair of runners 10 being equipped with the wooden soles 11 and each runner supporting a side frame member 12 consisting of angle iron as shown. The two side frame members 12 are secured together at their forward and rear ends by the means of the cross members 13, said cross members having their ends extending beyond the frame members and each extended end being formed with a recess 14 in the upper edge thereof, as shown. To each side frame member 12 at the forward end thereof there is secured a connecting member 15 each of which are connected to a link 16, in the manner shown, and the link 16 being in turn connected to a ring 17. To the ring 17 any suitable means may be connected for drawing the sled A and as seen the means provided will permit an even forward draft of the sled.

Upon each side frame member 12 there is secured a pair of angle members 18 which extend upwardly and converge toward each other, as shown, and having their upper ends connected by the means of a plate 19. Each plate 19 is formed with a suitable recess for journaling a shaft 20, said shaft rotatably supporting a drum 21, Figure 6. One end of the shaft is squared as at 22 suitable for positioning a crank thereon for manually rotating the same. The drum 21 is held against longitudinal movement in one direction by the means of a collar 23. Adjacent the other end of the drum there is adjustably secured a collar 24 by the means of a set screw 25, and between the collar 24 and end of the drum there is interposed a coil spring 26 and washer 27, the washer 27 being adapted to engage a washer 28 positioned in the end of the drum. The purpose of this construction is to frictionally resist the rotative movement of the drum 21.

Upon the drum 21 there is wound a thin canvas belt 29, which is of considerable length and between the layers formed by the belt when so wound there is positioned a plurality of plant sets of the type or character heretofore mentioned, such as indicated at 30. The plant sets are preferably positioned upon the belt so that when the belt is unwound the roots thereof will be foremost. The outer end of the canvas belt is led forwardly of its drum and passed over a roller 31 which is carried by a shaft 32 journaled between the side frame members 12. From this point the belt continues rearwardly and has its end passed about and secured to the rewinding drum 33, said drum being suitably supported by a shaft 34 which is journaled in the upper ends of the vertical supports 35, said supports extending between the side frame members 12 and the runners 10 and being secured thereto so that in addition to supporting the shaft 34 they form a brace between the runners and side frame members. The drum 33 is held against movement in one direction by a collar 36, and is provided with a friction disk arrangement generally indicated at 37 which is a duplicate of that shown and described for the drum 21. This arrangement is adapted to yieldingly resist the rotative movement of the drum 33 upon the shaft 34.

Adjacent the roller 31 at the forward end of the sled there is secured to each side frame member 12 an upwardly extending bar 38, said bars having journaled between their upper ends a shaft 39, which carries a roller 40. Upon each end of the shaft 39 there is pivoted an arm 41 and between the outer ends of the arms 41 there is journaled a roller 42. One end of each arm 41 is formed with a projection 43 and the upper end of each bar 38 is formed with a similar projection as indicated at 44. Each pair of projections so formed are provided with suitable openings adapted to receive the screw 45, said screw having a head 46. As is obvious by manipulating the screw 46 the position of the arms 41 may be changed, that is, swung upwardly or downwardly. Forward to the roller 31 there is positioned a roller 47 which is carried by a shaft 48, said shaft being suitably journaled between the side frame members 12. An endless belt 49 is passed over the rollers 40, 42 and 47, said belt being preferably of rubber and of a less width than the canvas belt 29.

Between the rollers 47 and 31 there extends a cross member 50 to which there is secured the forward end of a curved sheeting generally indicated by the reference numeral 51. The rear end of said sheeting being supported by the bridge portion of the U-shaped member 52, the legs of which are secured to the side frame members 12 and to the runners 10 as shown in Figures 4 and 1. The curved sheeting 15 is adapted to lift the belt 29 as it passes thereover and likewise the belt 49 for the purpose of bringing the plant sets to a substantially vertical position at the time that they drop from between these belts as illustrated in Figure 4.

Adjacent the front end of the sled there is secured between the side frame members 12 a cross member 53 which is of angle iron as shown, and which carries a plow generally indicated by the reference numeral 54, said plow being supported by the means of a stem 55 extending upwardly therefrom, and said stem being held by a bracket 56.

As is obvious by the manipulation of the set screw 57 the plow 54 may be lowered or raised to any desired position. The bracket 56 is secured to the cross member 53 by the means of bolts, and as is also obvious the position of the bracket may be changed for adjusting the plow laterally if so desired. The plow 54 is of course positioned so that the furrow which it will provide during forward movement of the sled will be in proper position to receive the plants 30 as they are dropped from between the belts 29 and 49.

Rearward of the shaft 20 there is journaled between the frame members 12 a power shaft 58, said shaft carrying a roller 59 at a point intermediate its ends over which the belt 29 may pass previous to being rewound by the drum 33. Adjacent each end of the shaft 58 there is formed a collar 60 which is adapted to prevent inner movement of a pulley 61 carried upon each end of the shaft 58. Each pulley 61 is held against becoming detached from the shaft 58 by the means of a cotter pin indicated at 63. Figure 3. Upon the outer face of each pulley 61 there is secured a plurality of radial angle members 64, said members being detachably secured by the means of suitable screws or bolts and each member carrying at its outer end a diamond shaped plate 65, said plates being adapted to enter the ground as the sled moves forwardly and apply power for rotating the shaft 58. Adjacent the inner side of each pulley 61 there is fitted upon the shaft 58 a bell-shaped member 66 which has its outer side formed with teeth 67 adapted to mesh with similar teeth 68 formed upon the inner hubs of the pulley 61. The members 66 are splined upon the shaft 58 as indicated at 69 and intermediate bearings 70 in which the shaft 58 is journaled, and said bell-shaped members 66 there is interposed a compression spring 71 which is adapted to normally hold the members 66 in engagement with the pulleys 61.

For controlling the members 66 of the shaft 59 there is provided the control means generally shown in Figure 5 which comprises a shaft 72 journaled between the side frame members 12, as shown in Figures 1 and 2, and having an arm 73 extending from each end. The outer end of each arm 73 has an upwardly turned portion 74 which terminates in a forwardly turned portion 75. To the shaft 72 there is rigidly connected a lever arm 76 which when raised upwardly will cause the lowering of the arms 73, and said arms in turn engaging upon the outer surface of the bell-shaped members 66 causing the same to move inwardly and thereby disconnecting the pulleys 61. Upon downward movement of the handle bar 76 the bell-shaped members 66 are made free and permitted to again establish connection with the pulleys 61. Also the arms 73 of the lever control means described carry therebetween a shaft 77 upon which there is rotatably mounted a roller 78. The purpose of the rollers 78 is to further tension the belt 29 and will later be more fully described.

Upon the power shaft 58 there is secured a pair of sprocket wheels, one of said wheels having passed thereover a sprocket chain 80 which also passes over a sprocket wheel secured upon the outer end of the shaft 34. The other sprocket wheel carried by the power shaft has passing thereover a sprocket chain 81 which is led to the forward end of the sled and there passed over a sprocket wheel carried by the shaft 48. The shaft 48 in turn carries a sprocket wheel near its opposite side as indicated at 82, Figure 2, and over which passes a sprocket chain 83, said sprocket chain also passing over a sprocket wheel carried by a shaft 84, said shaft being journaled between the runners 18 and carrying a grooved pulley 85, said pulley having passing thereabout a rope 86 which is endless and passes over a second grooved pulley 87 carried by a shaft 88 rotatably supported between the runners 10, Figure 4.

It may be here mentioned that the plow 54 should be adjusted so that the vertical side of the furrow made thereby will be so positioned that the plant sets 30 when dropped into the furrow will be supported thereby upon one side. The rope 86 is positioned so that it will support the other side of the plant sets when the machine is operating and thus retain them in a vertical position.

Forward to one of the legs of the U-shaped supporting member 52 there is secured a scraper generally indicated at 89, Figure 1, and which sets at such an angle that as the sled advances it will move the earth turned out by the plow 54 in forming its furrow back into the furrow and thus cover the roots of the plant sets, and also leave the ground level.

At the rear end of the sled there is provided suitable cross members for supporting a water tank generally indicated at 90, said tank having a removable cover indicated at 91 which may be removed for filling the same with water and having a discharge pipe 92 which is provided with a sprinkler head 93 and a stopcock 94. Also upon one side of the tank there is secured a catch member 95 with which the lever arm 76 may be brought into engagement for securing the same in its position for holding the bell shaped members 66 out of engagement with the pulleys 61.

In the operation of the present machine and apparatus the belt 29 is wound upon the drum therefor and the plants 30 positioned intermediate the layers of the belt in the manner heretofore described. Suitable means are connected to the sled so that the same may be drawn across the field whereupon the pulleys 61 will be caused to rotate by the members 64. After all the parts have been properly adjusted and it is desired to proceed with the transplanting of the plant sets then the lever arm 76 is released from the catch 95 and thus permitting the bell-shaped members 66 to establish connection with the pulleys 61 for rotating the power shaft 58. Upon this occurring the shaft 34 will rotate in the proper direction and likewise the shaft 48. The shaft 48 will drive the belt 49, while the shaft 34 will draw upon the belt 29 for unwinding the same from the drum 21. As the belt 29 is unwound the plants will pass beneath the belt 49 and are dropped at a point between the rollers 47 and 31 with the roots thereof pointing downward. The plant sets will fall in the position shown in Figure 4 and the rope 86 which will be moving will hold the plants in their vertical position until the scraper 89 pushes earth about the roots of the plants and positions the same. As the sled continues to advance the plants so set will come beneath the sprinkler 93 and receive their initial watering.

After the belt 29 has been fully unwound from the drum 21 the power shaft may be disconnected from the pulleys 61 and a crank connected with the shaft 20 and the belt 29 rewound upon the drum 21, and during the rewinding the plants may be again positioned intermediate the layers of the belt and thus reloading the belt 29 for another operation.

It often occurs when transplanting plant sets that it is desired to have the rows extend in parallel lines in order that the plants can be cultivated two ways. If such is the case the present machine may be utilized by a few minor changes. In planting the sets in this manner, a rope is attached to a stake at one side of the field and extended to the other side of the field and is secured to another stake or post. The rope of course is to mark a line in which the row of plants should be placed. In utilizing the present machine the rope is passed through the recesses 14 on similar sides of the cross members 13 and is also wound once about the pulleys 61. Now the angle members 64 are removed from the pulleys 61 and as is obvious as the sled is drawn across the field the rope will cause power means for rotating the shaft 58. When the sled has reached the other side of the field then the same may be reversed and the rope threaded upon the opposite side of the sled and thus the same operation may be repeated. In each instance, in addition to supplying the power for rotating the shaft 58 the rope used also forms a guide or a line for directing the course of travel of the sled.

I claim:—

1. A plant setting machine of the character described, comprising in combination, a sled, a drum rotatably supported upon the frame of said sled, a belt wound upon said drum, a plurality of plant sets arranged intermediate the layers of said belt and their roots extending in a direction similar to the movement of the cylinder for the unwinding thereof, means for causing the unwinding of said belt, means for causing the plant sets to be dropped vertically from said belt with the roots pointing downwardly, means for forming a furrow into which said plant sets may drop, and means for covering the roots of said plant sets with soil.

2. A plant setting machine of the character described, comprising in combination, a sled, a drum rotatably supported upon the frame of said sled, a belt wound upon said drum, a plurality of plant sets arranged intermediate the layers of said belt and their roots extending in a direction similar to the movement of the cylinder for the unwinding thereof, means for causing the unwinding of said belt, means for causing the plant sets to be dropped vertically from said belt with the roots pointing downwardly, a plow forming a furrow into which said plants may drop, the one side of which is vertical and adapted to support the plants against falling in one direction, means adapted to support the plants from falling in the opposite direction, and means for covering the roots of said plants with soil.

3. A plant setting machine of the character described, comprising in combination, a sled, a drum rotatably supported upon the frame of said sled, a belt wound upon said drum, a plurality of plant sets arranged intermediate the layers of said belt and their roots extending in a direction similar to the movement of the cylinder for the unwinding thereof, means for causing the unwinding of said belt, means for causing the plant sets to be dropped vertically from said belt with the roots pointing downwardly, a plow forming a furrow into which said plants may drop, the one side of which is vertical and adapted to support the plants against falling in one direction, a pair of grooved pulleys in spaced relation, an endless rope passing over said pulleys, said rope being adjacent the opposite sides of said plants when dropped into the furrow, means for driving one of said pulleys to cause movement of the rope and thereby supporting the plants from falling in the opposite direction, and means for covering the roots of said plants with soil.

4. A plant setting machine of the character described, comprising in combination, a sled, a drum rotatably supported upon said sled, a belt rolled upon said drum and having plant sets arranged intermediate its layers, the roots of which point in a direction similar to that for unwinding the belt, a roller at the forward end of the sled over which the outer end of said belt may pass, a rewinding drum in the rear of said roller to which said belt is connected, a plow adapted to form a furrow into which said plants may be dropped when passing over the said pulley mentioned, means for rotating the rewinding drum as the sled advances, and means for covering the roots of said plants with soil.

5. A plant setting machine of the character described, comprising in combination, a sled, a drum rotatably supported upon said sled the longitudinal axis of which is disposed in a horizontal plane, a belt rolled upon said drum and having plant sets arranged intermediate its layers, the roots of which point in a direction similar to that for unwinding the belt, a roller at the forward end of the sled over which the outer end of said belt may pass, a rewinding drum in the rear of said roller to which said belt is connected, a plow adapted to form a furrow into which said plants may be dropped when passing over the said pulley mentioned, means for rotating said rewinding drum, said means being actuated by the forward movement of said sled, and means for covering the roots of said plants with soil.

6. A plant setting machine of the character described, comprising in combination, a sled. a drum rotatably supported upon said sled, a belt rolled upon said drum and having plant sets arranged intermediate its layers the roots of which point in a direction similar to that for unwinding the belt, a roller at the forward end of the sled over with the outer end of said belt may pass, a rewinding drum in the rear of said roller to which said belt is connected, a plow adapted to form a furrow into which said plants may be dropped when passing over the said pulley mentioned, means associated with said belt whereby the plant sets will be brought to a substantially vertical position before being dropped, a plow upon the furrow into which said plants may be dropped, means for operating said rewinding drum, and means for covering the roots of said plants as said sled advances.

7. A plant setting machine of the character described comprising in combination, a vehicle, a drum rotatably supported thereby, a belt wound about said drum having plant sets arranged intermediate the layers thereof, a roller journaled at the forward end of said vehicle over which the belt may pass, a winding drum at the rear of said roller adapted to re-wind the belt, means intermediate the forward roller and the first named drum adapted to hold a section of the belt substantially vertical, belt means associated therewith adapted to permit the plants to drop when disposed vertically, and means for covering the roots of the plants after being dropped.

8. A plant setting machine comprising a vehicle. a drum rotatably supported thereby, a belt wound upon the drum, a plurality of plant sets arranged between the layers of the belt with the roots thereof extending in a direction corresponding to the unwinding of the belt, means for unwinding the belt with the movement of the vehicle, means for rewinding the belt with the movement of the vehicle, means between the rewinding means and drum supporting the belt adapted to bring a section of the belt in a substantially vertical plane so that the plants when passing thereover will be dropped with roots downwardly, and means for covering the roots of the plants after being dropped.

9. A plant setting machine comprising a vehicle, a drum rotatably supported thereby, a belt wound upon the drum, a plurality of plant sets arranged between the layers of the belt with the roots thereof extending in a direction corresponding to the unwinding of the belt, means for unwinding the belt with the movement of the vehicle, means for rewinding the belt with the movement of the vehicle, means between the rewinding means and drum supporting the belt adapted to bring a section of the belt in a substantially vertical plane, a second belt having a portion thereof engaging with the vertical portion of the plant carrying belt and adapted to co-operate with the plant carrying belt for dropping the plants with roots downwardly, means for adjusting the tension existing between the two belts, and means for covering the roots of the plants after being dropped.

LOUIS F. KEPPLER.